United States Patent [19]

Scheer

[11] 4,187,499
[45] Feb. 5, 1980

[54] ELECTRICAL PROGRAMMER FOR THE AUTOMATIC CONTROL OF A HOUSEHOLD APPLIANCE

[75] Inventor: Erich Scheer, St. Georgen-Peterzell, Fed. Rep. of Germany

[73] Assignee: KUNDO - Kieninger & Obergfell, St. Georgen/Schwarzwald, Fed. Rep. of Germany

[21] Appl. No.: 834,873

[22] Filed: Sep. 20, 1977

[30] Foreign Application Priority Data

Sep. 20, 1976 [DE] Fed. Rep. of Germany ....... 2642188

[51] Int. Cl.² .............................................. H04Q 3/00
[52] U.S. Cl. ................................ 340/309.1; 340/309.4
[58] Field of Search ................. 340/309.1, 309.4, 163, 340/147 P; 318/601, 602

[56] References Cited

U.S. PATENT DOCUMENTS

| | | | |
|---|---|---|---|
| 3,120,652 | 2/1964 | Weighton | 340/309.1 |
| 3,187,318 | 6/1965 | Chapman | 318/602 X |
| 3,370,289 | 2/1968 | Hedgcock | 318/602 X |
| 3,378,741 | 4/1968 | Sutton | 318/602 X |
| 3,475,997 | 11/1969 | Wohlfeil | 318/602 X |
| 3,573,589 | 4/1971 | Berry | 318/602 X |
| 3,752,969 | 8/1973 | Kiffmeyer | 318/602 X |
| 3,774,056 | 11/1973 | Sample | 340/309.1 |
| 3,826,964 | 7/1974 | Byrne | 318/602 |

Primary Examiner—Harold I. Pitts
Attorney, Agent, or Firm—Karl F. Ross

[57] ABSTRACT

A programmer for a household appliance, such as a washing machine or a dishwasher, comprises a disk-shaped carrier 41 and a position indicator 43 synchronized therewith, the indicator working into a comparator 36 also receiving a signal pattern from a read-only memory 35 addressed by a counter 30 which advances under the control of a timing circuit. The latter comprises a frequency divider 20, driven by alternating current from a utility network, certain of whose stages work into a set of AND gates 22-24 that are unblocked by signals read out from the memory in various program phases. The incrementation of the program may be temporarily inhibited by additional logical circuitry 80-83 responsive to external parametric conditions, such as the temperature of the liquid level in the controlled appliance. Unwanted phases of a maximum program recorded on the program carrier 41 may be skipped under the control of a plug-in key card 64 or a selector switch 95.

13 Claims, 7 Drawing Figures

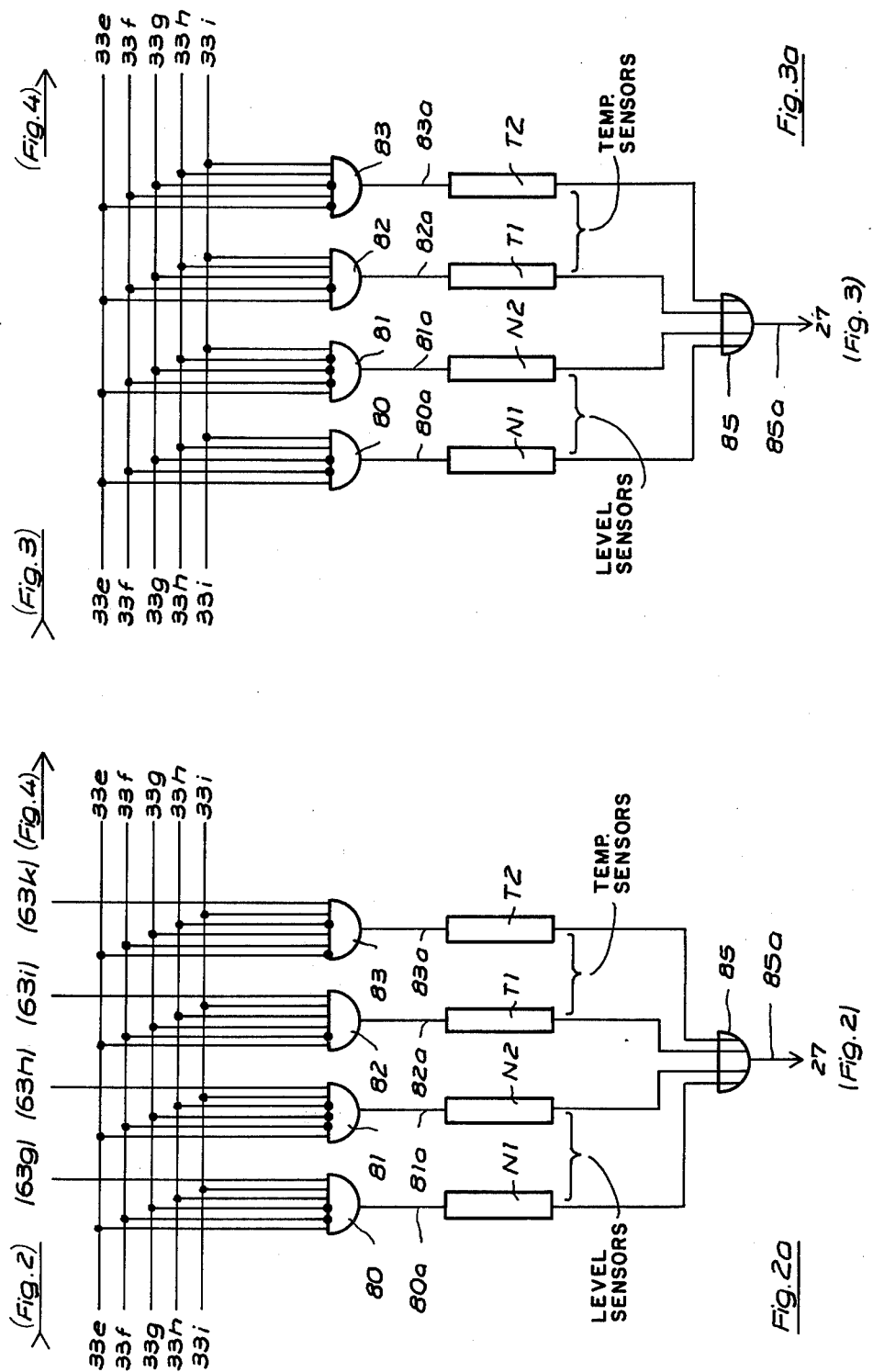

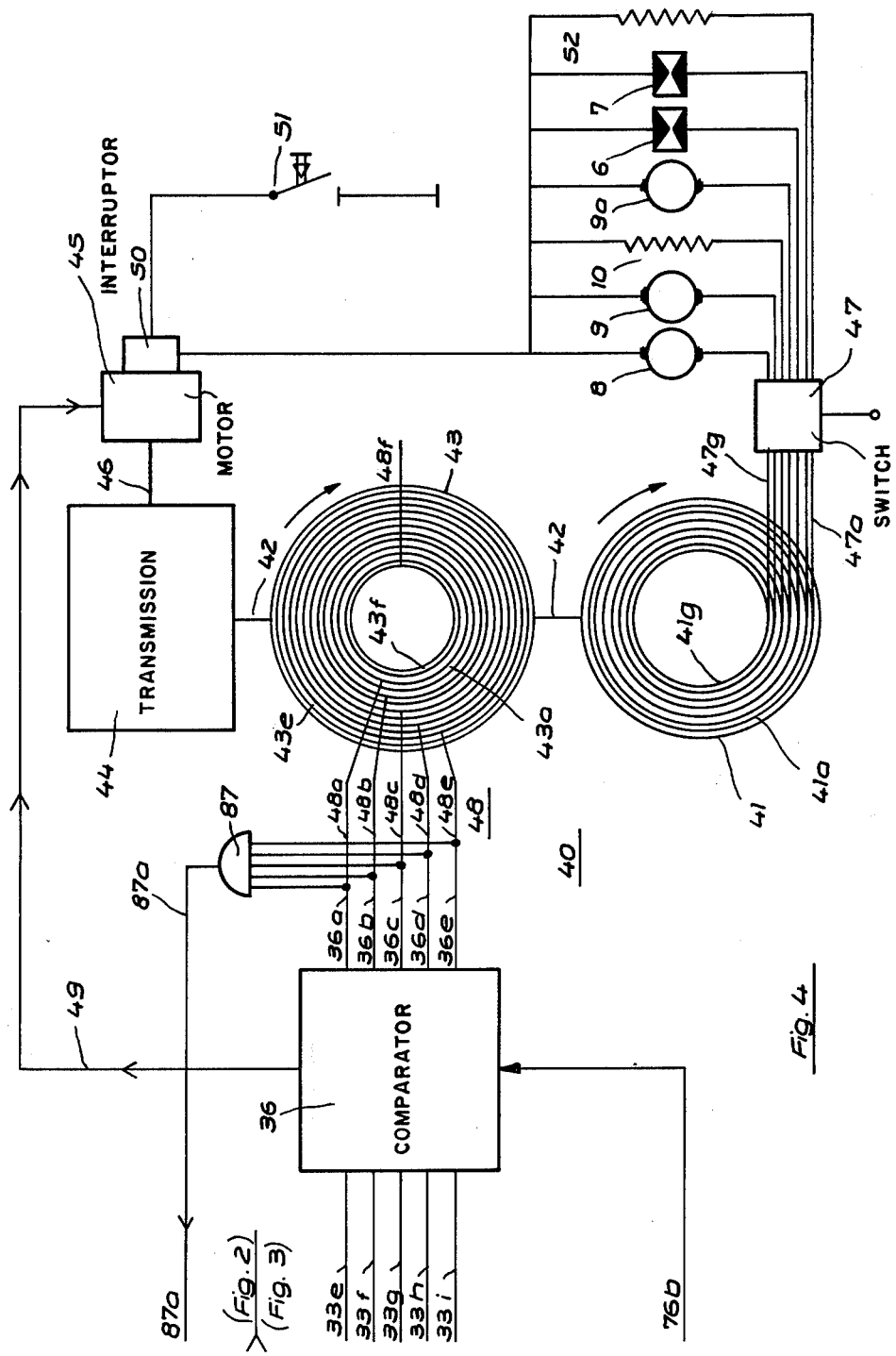

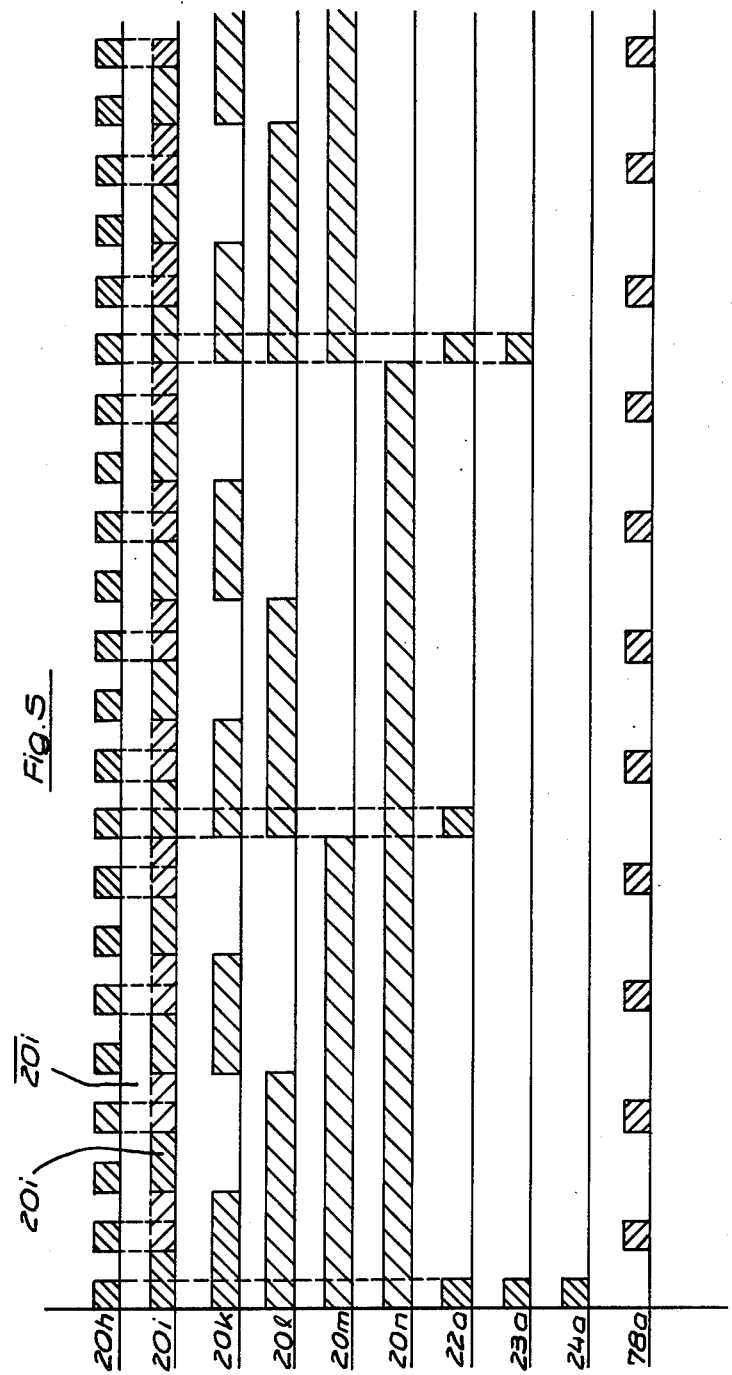

ELECTRICAL PROGRAMMER FOR THE AUTOMATIC CONTROL OF A HOUSEHOLD APPLIANCE

FIELD OF THE INVENTION

My present invention relates to an electrical programmer for the automatic control of a household appliance, preferably for the dispensation of multiple programs, with an intermittently steppable program carrier determining the various switching conditions in dependence upon its setting.

BACKGROUND OF THE INVENTION

There is already known an electrical programmer wherein a program carrier designed as a shaft carrying cam disks, individually scanned by spring assemblies, is intermittently driven by a continuously operating electric motor, especially a synchronous motor, via a camming sequencer. In that case there occurs in certain time intervals, e.g. of one or two minutes, an actuation of the stepping pawl and with it the advance of the cam-disk-carrying shaft by one incremental step. Supplemental devices are also known which make it possible to lift the stepping pawl, advancing the cam-disk-carrying shaft, during certain program phases out of its position of engagement with the ratchet wheel, in order to achieve in this way a program interruption dependent on physical parametric conditions. For this purpose there can be provided, for example, a small electromagnet which is energized for the duration of the contemplated program interruption and which lifts off the stepping pawl by attracting its armature.

A published further development of such a programmer is designed to permit a reduction of the step length of the program carrier during such advances of the program carrier which do not result in a change of the incremental states of the program, being thus more or less dependent on time, as against an increase in the step length upon performance of advances of the program carrier serving for a change in the incremental states of the program in order to provide a sufficient safety margin for carrying out the changeover.

Besides such program carriers, designed as cam-disk-carrying shafts, program carriers have also become known which, for example, are formed as flat program disks with concentric cam tracks, the latter being scanned by contact-lever assemblies arranged in groups.

In another known electrical programmer, use is made of two separate program carriers which, however, can be moved in mutual synchronism, or can even be interconnected or constitute a structural unit, for establishing or determining the incremental program states on the one hand and the duration of the individual program states on the other hand.

In this instance one may use wholly different time intervals, predeterminable by the program carrier, from one advance of the program carrier to the next, the program carrier being generally advanced or stepped only when a change in the incremental program state becomes necessary pursuant to the program.

Although these known electrical programmers have become fairly widely distributed, they are subjected in operation to mechanical wear and are bulky, i.e. require relatively much space, and their manufacture as well as repairs necessitate a careful adjustment of the control system constituting the programmer.

There is further required a considerable investment in components, especially transmission parts, associated with various contacts serving for the internal control of the programmer. These known devices are further characterized by a relatively high noise level during the evolution of the program.

An electrical programmer is also known wherein the interval from one advance of the program carrier to the next is determined by the automatic presetting of an electronic pulse counter, especially a frequency counter, in dependence upon the program-carrier disk, with the aid of contacts scanning same. This known electrical programmer, however, must also comprise numerous contacts which are necessary for the control of the internal switching operations of the device and which, of course, represent a certain expenditure and also an unpredictable source of troubles.

OBJECT OF THE INVENTION

The object of my present invention is to provide a system of the general type described above, designed for the automatic control of an electrical appliance to be sequentially stepped through a predetermined number of operating phases, having means for the selective suppression of certain of these phases forming part of a maximum operating program stored therein.

SUMMARY OF THE INVENTION

The present system comprises drive means for rotating a control unit including a program carrier which generates, in successive working positions, a multiplicity of signal patterns respectively corresponding (in an identical or complementary manner) to instruction codes that are sequentially read out in a predetermined order of succession from a read-only memory when the latter is addressed by an electronic counter. The control unit is provided, in a manner known per se, with output means for the selective activation and deactivation of components of the controlled appliance in any of its working positions. An electronic comparator, with input connections to the read-only memory and to the program carrier, is connected to the drive means associated with the control unit for arresting same upon detecting a match between an instruction code emitted by the memory and a signal pattern generated by the program carrier as the address counter is progressively advanced by stepping pulses from a suitable source to command the sequential readout of successive instruction codes of the maximum operating program stored in the memory.

In parallel with the electronic comparator there is connected, in accordance with my present invention, a presettable decoder for detecting certain instruction codes which pertain to unwanted phases of the maximum operating program. In response to such detection the decoder inhibits the arresting of the program drive by the comparator with simultaneous emission of a phase-skipping pulse fed to the counter for advancing same out of turn. The setting of the decoder can be varied with the aid of selector means which may comprise a manual switch or a programmable ancillary memory.

Pursuant to a more particular feature of my invention, the decoder designed to detect the unwanted program phases comprises a plurality of coincidence circuits such as AND gates with inverting and noninverting inputs connected in various combinations to the several output leads of the read-only memory which carry the instruction codes in the form of combinations of binary signals. These coincidence gates may have blocking inputs energizable by the ancillary memory or outputs in series with the manual switch referred to above.

The phase-skipping pulses designed to advance the counter out of turn may be derived from the same source as the stepping pulses which for this purpose is provided with first output means carrying the stepping pulses and with second output means carrying additional pulses offset therefrom, these additional pulses being selectively passed by gating means controlled by the unwanted-phase decoder. Advantageously, the pulse source comprises a frequency divider with a multiplicity of cascaded stages, certain of these stages supplying different signal combinations to the aforementioned first and second output means.

According to yet another feature of my invention, the first output means of the pulse source may be responsive to a blocking signal from the read-only memory for temporarily preventing the advance of the address counter by the stepping pulses, the counter being restarted only when a sensor actuated by the memory in the presence of the blocking signal detects a predetermined external parameter associated with the controlled appliance.

BRIEF DESCRIPTION OF THE DRAWING

The above and other features of my invention will now be described in detail with reference to the accompanying drawing in which:

FIG. 2a shows additional circuit components included in the system of FIG. 2;

FIGS. 3 and 3a show modifications of the circuitry illustrated in FIGS. 2 and 2a;

FIG. 4 shows further components of the system embodying my invention; and

FIG. 5 shows a time diagram relating to the operation of the system of FIG. 2 or 3.

SPECIFIC DESCRIPTION

Figure 1:
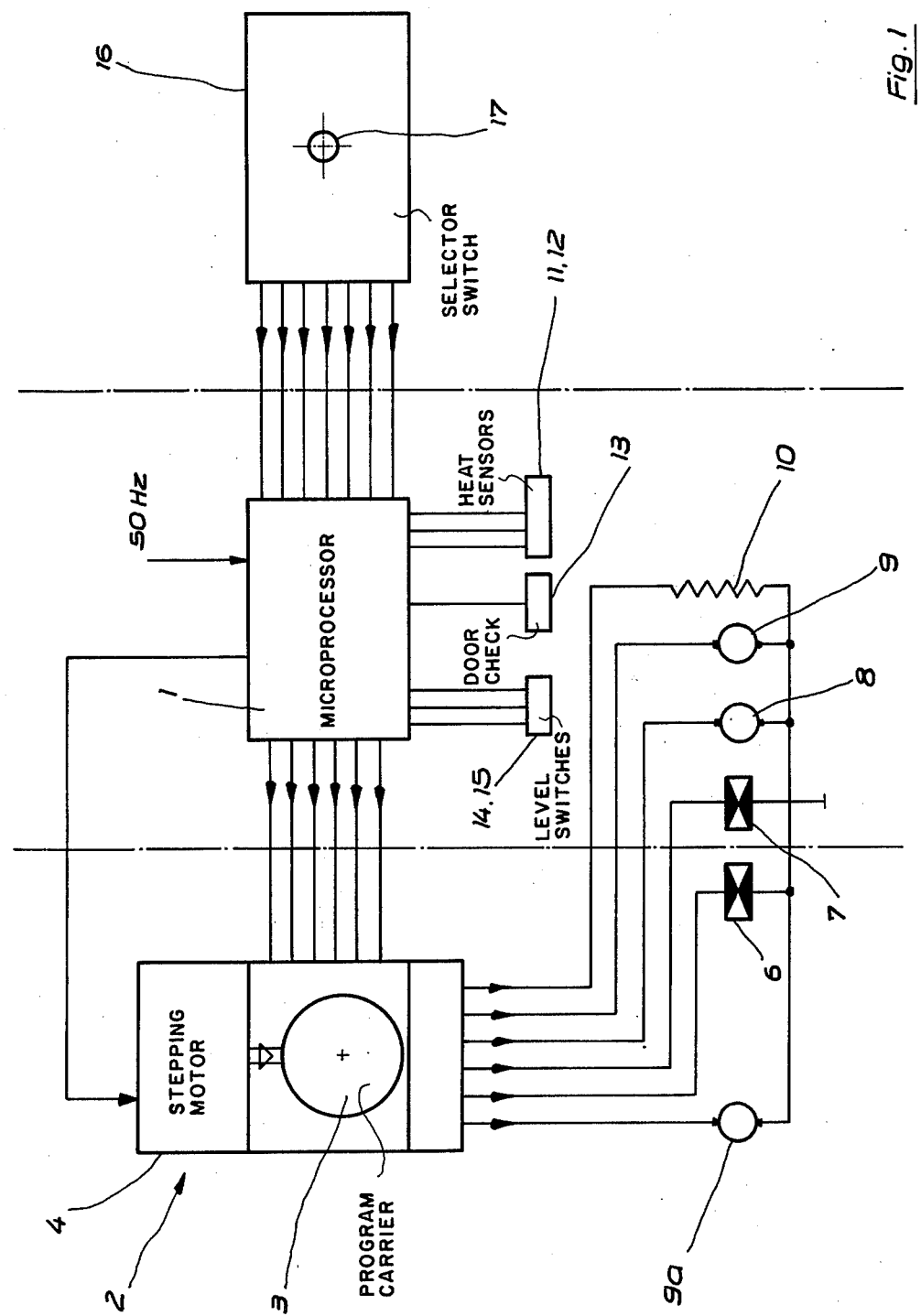
FIG. 1 shows a schematic representation of a control system embodying my invention.

In FIG. 1 there is represented at 1 a microprocessor including a frequency divider as well as a so-called read-only memory consisting in turn of an electronic counter with coded input, a decoder and a storage matrix following same. All the aforementioned components are combined in a chip according to integrated-circuit technology. The storage matrix of the read-only memory in the microprocessor is programmed either by the manufacturer of the chip or else by the user according to the required control program. This can be effected in known manner by above-normal current pulses applied, by a device specially made for this purpose, to the microprocessor chip pursuant to a table corresponding to the requisite program. To this end one may use the known programming techniques, e.g. the NiCr cell or the polycrystalline-silicon cell. The utilization of the burn-through method for programming is advantageous since, as a rule, it is not necessary to modify a program once established.

The advance of the counter serving to address the data stored in the read-only memory of the microprocessor can be controlled through the available utility network. For this purpose the network frequency is stepped down via a frequency divider to the value required for activating the counter.

The microprocessor 1 is connected with a driving device 2 for the program carrier 3 which executes stepwise motions, corresponding to the evolution of the program, in dependence upon the control program of the microprocessor. For this purpose it is advantageous to use a small induction or synchronous motor which is intermittently cut in with a predetermined rotary speed.

The drive motor 4 advances the program carrier 3 with each cutting-in operation whereby the switching of the household appliance to be controlled occurs via the power contacts associated with the program carrier. For this purpose there are provided valves 6, 7, drive motors 8, 9 as well as a resistor 10 for heating the household appliance.

Co-operating with the microprocessor are thermal sensors 11, 12, a door safety device 13 as well as level switches 14, 15.

The evolution of the program of the microprocessor 1 is suitably variable by means of a selector switch 16 so that, according to the setting of e.g. an adjusting knob 17, a distinctive program evolution can be achieved. Thereby, in a manner known per se, it is possible to adapt the machine program for the control of the corresponding household appliance, emitted by the microprocessor or by the electrical programmer, to the household articles to be processed.

This possibility is of particular importance for the washing machines and dishwashers commonly used in the household.

Figure 2:
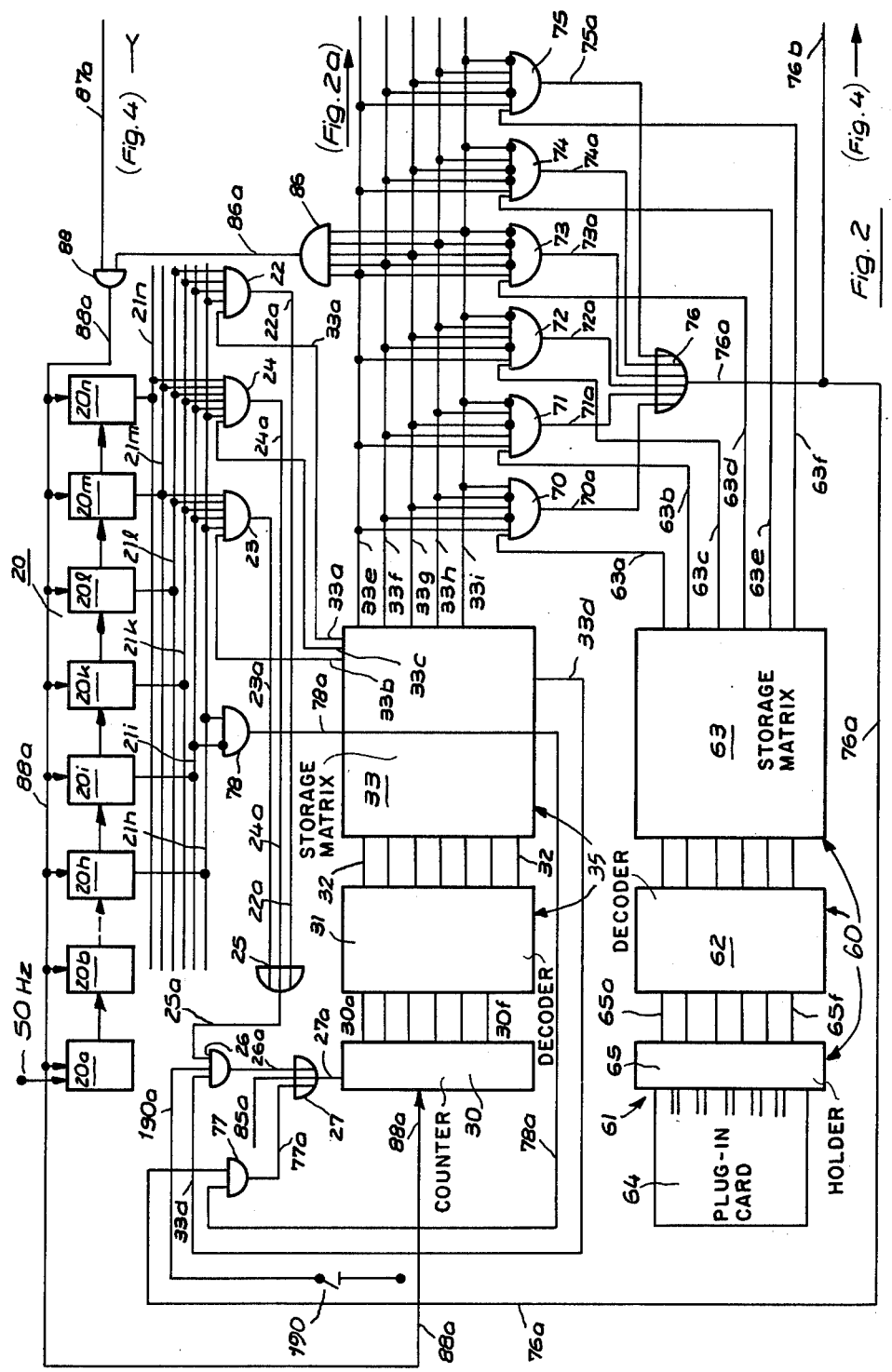
FIG. 2 shows details of the logical circuitry in an embodiment of the invention.

In FIG. 2 an embodiment of the invention has shown in detail as a circuit arrangement.

A frequency divider 20 with a multiplicity of cascaded stages 20a–20n is controlled in a time-stabilized manner by the network frequency, e.g. of 50 or 60 Hz. There occurs a continuous division by respective factors of 2 from the divider stage 20a of the divider stage 20n. Altogether there are provided 13 divider stages, the last divider stage 20n delivering pulses at intervals of about 2.7 minutes in its output if the network frequency is 50 Hz. The two preceding divider stages 20m and 20l produce pulses at intervals of about 1.4 minutes and about 0.7 minute. According to an advantageous feature of the invention, the pulse emissions of the divider stages 20l to 20n are selectively used according to the program of the fixed-data emitter for the control of the program to be carried out.

In order to obtain brief control pulses from the frequency divider 20, the pulse trains of several stage outputs thereof are superposed. Thus, in the circuit arrangement of FIG. 2 the pulse trains of divider stages 20h to 20n are fed to connecting lines 21h to 21n and these connecting lines are tied to AND gates 22, 23 and 24 through which the superposition of the individual pulse trains is effected. The AND gate 22 is tied to the connecting lines 21h to 21l, the AND gate 23 is tied to the connecting lines 21h to 21m and the AND gate 24 is tied to the connecting lines 21h to 21n.

FIG. 5 shows how the narrowing of the pulses is achieved by the superposition of the individual pulse trains. The superposition of the pulse trains 20h to 20n results in a pulse of about 2.5 seconds within a time interval of 2.7 minutes, a superposition of pulse trains 20h to 20m results also in a pulse length of 2.5 seconds every 1.4 minutes, and a superposition of the pulse trains 20h to 20l alone, finally, results in a pulse length of about 2.5 seconds within a time interval of 0.7 minutes.

The output leads 22a, 23a and 24a of the AND gates 22, 23 and 24 extend to an OR gate 25 whose output lead 25a is connected to the input of an AND gate 26. The output lead 26a of this AND gate 26 is extended to an OR gate 27 whose output lead 27a is connected to the input of an electronic counter 30. An input 190a of AND gate 26 is energized upon closure of a switch 190.

The electronic counter 30 is followed by a decoder 31 which converts the $2^6$ address codes on leads 30a–30f into $2^6$ explicit so-called word signals which are fed to the storage matrix 33 by way of lines 32. The components 30, 31 and 32 constitute a read-only memory 35.

The storage matrix 33 is programmed, according to the requisite program, either by the manufacturer of the component 35 or by the user pursuant to a suitable method, preferaby by burning in. The storage matrix 33 is initially provided with so-called explicit outputs 33a–33d for individual signals of which the first three are connected to the AND gates 22, 23 and 24; lead 33d, normally conductive, extends to an input of AND gate 26. There are further provided outputs 33e–33i on which there appears a signal pattern coded according to the binary code $2^n$, i.e. $2^n = 2^5 = 32$ different signal patterns can be emitted by way of the output multiple 33e–33i.

In FIG. 4 there has been shown an assembly 40 for driving the programmer and controlling the operation of an associated appliance. A program carrier 41 is connected by way of a drive shaft 42 together with a position-indicating disk 43 via a transmission 44 with a drive motor 45 through a transmission shaft 46.

The program carrier 41, advantageously designed as a dished disk, has concentric tracks 41a to 41g which are scannable by contact levers 47a to 47g of a contact assembly 47.

The position-indicating disk 43, which is fixedly connected with the program carrier 41 via the drive shaft 42 so as to rotate synchronously therewith and which may form a unit with same, is provided with conductor tracks 43a–43f which are concentrically arranged and are scannable by sliding springs 48a to 48f. The contact springs 48a–48e are connected via leads 36a–to 36e to an electronic comparison circuit 36.

The conductor track 48f of the position-indicating disk 43 serves as a common junction for the printed conductor tracks 43a to 43e. These five conductor tracks 43a–43e carry a coded positional pattern which either corresponds to the pattern transmitted via the lines 33e–33i from the storage matrix 33 or constitutes the complement thereof.

The electronic comparison circuit 36 is connected via a line 49 to the drive motor 45 of the control unit 40.

The electronic comparator 36 energizes the drive motor 45 whenever the coded positional pattern transmitted by the contact springs 48a–48e, predetermined by the conductor tracks 43a–43e of the position-indicating disk 43, does not correspond to the coded patterns of the outputs 33e–33i of the storage matrix 33.

Through its energization via line 49 the drive motor 45 is cut in and drives the position-indicating disk 43 and the program carrier 41 via the transmission shaft 46, the transmission 44 and the drive shaft 42. The rotary motion of these three elements is maintained until a pattern is sensed by the contact springs 48a–48e on the conductor tracks 43a–43e of the position-indicating disk 43 corresponding either identically or complementarily to the coded pattern emitted by the storage matrix 33 on the outputs 33e–33i. When this situation occurs, the electronic comparison circuit 36 no longer energizes the line 49 leading to the drive motor 45 and the latter is cut off. On the leads 36a–36e or 33e–33i it is possible to represent $2^5 = 32$ distinct signal patterns. This means, strictly speaking, that the position-indicating disk 43 together with the program carrier 41 could occupy 32 different positions. This number of positions of parts 41 and 43 corresponds to as many different contact operations of the contact-lever group 47a–47h of switching device 47. This distinct number of contact-operating possibilities is generally sufficient to make available the requisite incremental program states or phases. If necessary, it is readily possible to supplement the contact device 47 shown in the embodiment of FIG. 4 by disposing a further such contact device on the laterally or diametrically opposite side of the program carrier, sensing additional cam tracks to be provided for this purpose. The contact device 47 of the embodiment according to FIG. 4 actuates the aforementioned drive motors 8, 9, heating resistor 10 and valves 6, 7, as well as a pump motor 9a, which constitute the operating elements of, for example, a household washing machine or dishwasher controlled by the system embodying my improved programmer.

The drive motor 45, conveniently designed as a small induction or asynchronous-synchronous motor, is advantageously provided with a conventional shiftable armature not further illustrated. At the instant of energization of the drive motor 45, this shiftable armature actuates under the influence of the stator field a contact device 50 which, as long as the parts 41 and 43 are driven by the motor 45, causes the operating elements (7–10) of the controlled household appliance to remain de-energized whereby an intermittent operation thereof and thus an objectionable raising of the radio-interference level are avoided.

In series with the operating elements (7–10) of the controlled household appliance, the contact device 47 and the interruptor contact 50, there is provided a self-locking switch 51 remaining closed upon being manually actuated.

When the program to be carried out is completed and the program carrier 41 reaches its rest position, a heating resistor 52 is energized through the contact lever 47a and actuates thereby a bimetallic release device connected with the switch 51. The switch 51 is thereby disengaged and sutomatically returns to its open position.

As further shown in FIG. 2, there is provided a programmable ancillary read-only memory 60 consisting of the selector switch 61, a decoder 62 and a storage matrix 63.

The selector switch 61 comprises a plug-in card 64 which is provided with coded patterns, e.g. printed conductor tracks, and is received in the holder 65. This holder 65 is connected to the address side of decoder 62 by lines 65a–65f.

The plug-in card 64 carries coded patterns, as for example printed conductor tracks in a certain arrangement, establishing electrical connections at corresponding contact blades in holder 65 which are transmitted by way of leads 65a–65f to the address side of the decoder 62 as coded signal patterns.

I may also carry out a contactless program selection by means of the plug-in card 64. This could be done, for example, by providing for each input 65a–65f, present on the address side of decoder 62, dampable tuned circuits which, according to the distribution of printed conductor tracks on the plug-in card 64, undergo a distinctive adaptation to an oscillatory or non-oscillatory condition yielding the coded pattern.

Another possible programming method consists in providing the plug-in card 64 with small magnetic elements which act upon vacuum contacts, provided within holder 65, that are tied to the connecting lines 65a–65f. These details, however, have not been shown in FIG. 2 since they are known per se.

The coding according to the binary system $f=2^n=2^6$, present on the address side 65a–65f of the decoder 62, is resolved by the decoder 62 into 64 so-called word lines which are led to the storage matrix 63 and constitute its rows 1–64. This storage matrix 63 is programmed, similarly to the storage matrix 33 of the fixed-data emitter 35, either already by the manufacturer or only by the user. This occurs, advantageously, according to the so-called burning-in process similarly to what has already been described in conjunction with the main read-only memory 35.

Since, generally, the programmers required for the manufacture of programmed electrical household appliances are of uniform type and are produced in large quantities, and since furthermore a reprogramming of a programmer once programmed is neither necessary nor possible, it is preferable to carry out the programming already at the manufacturer.

To the outputs 33e–33i of the storage matrix 33 within read-only memory 35 there are connected a series of AND gates 70–75 with five of their respective six inputs. These AND gates 70–75, constituting a decoder, emit a signal whenever the outputs 33e–33i carry a pattern which corresponds to an incremental program state or phase not desired for one or more of the selectable programs.

The storage matrix 63 within the read-only memory 60 is connected by its output leads 63a–63f to the respective sixth inputs of the AND gates 70–75. With the aid of the plug-in card 64 there are selected, via the holder 65, the decoder 62 and the storage matrix 63 of the read-only memory 60, always those AND stages 70–75 which exhibit an output signal for those patterns that correspond to the incremental program states which are undesired in the respectively selected program and which are therefore to be rendered ineffectual or skipped.

For this purpose the outputs 70a–75a of AND gates 70–75 are combined in an OR gate 76 whose output 76a is connected to an AND gate 77 also tied to the output 78a of an AND gate 78. This AND gate is connected by way of two inputs via leads 21h and 21i to the outputs of divider stages 20h and 20i.

The input of the AND gate 78 connected to the divider stage 20i is inverting. This has the result that, in lieu of a pulse in the pulse train 20i of FIG. 5, a pulse gap 20i of this train becomes effective.

The control stepping of the electronic counter 30 takes place by way of AND gate 22, 23 or 24, selected by storage matrix 33 via connecting lines 33a, 33b, 33c, through the OR gate 25, the AND gate 26 and the OR gate 27. This gives effect, as is apparent from FIG. 5, to one of the pulses of train 20h identified forming part of the series 22a, 23a or 24a. By this stepping pulse the counter 30 is advanced and, via the output of storage matrix 33, a pattern is emitted which is here assumed to correspond to incremental program state not desired for the selected program.

Accordingly, there is generated at one of the outputs 70a–75a of gates 70–75 and thus also at the output of 76a of gate 76 a signal fed to the AND stage 77. If, then, gate 78 emits on its output 78a any pulse of the corresponding designated series in FIG. 5, there appears at the output 77a of AND gate 77 a phase-skipping pulse which is fed to the electronic counter 30 by way of OR gate 27. Pulse 78a appears at a later time than stepping pulse 22a, 23a or 24a on account of the inversion of the pulse train 20a, that is, the pulse 78 follows in the described embodiment 5.12 seconds after the immediately preceding stepping pulses.

By this delay pulse the electronic counter 30 is advanced by one further step 5.12 seconds after the last stepping pulse, via OR gate 25, whereby the unwanted incremental program state or phase is skipped. In some instances, also the program phase corresponding to the new count of the electronic counter 30 may be unwanted for the selected program so that at output 76a of OR gate 76 there appears again a skip signal which, via AND gate 77, initiates the transmission of an advancing pulse for the electronic counter 30 from the AND gate 78. The interval between successive phase-skipping pulses 78a—as is apparent from FIG. 5—measures 7.68 seconds.

The output 76a of OR gate 76 is further tied by way of a connection 76b to the electronic comparison circuit 36. As long as the output 76a carries a blocking signal, the line 49 and thus the drive motor 45 remain de-energized. The stepping of carrier disk 41 is, accordingly, initiated only upon the appearance of the signal pattern for the next admissible incremental program state at the outputs 33e–33i of storage matrix 33.

By the inclusion of additional stages of frequency divider 20 it is, obviously, possible to reduce the delays between the stepping pulses 22a, 23a, 24a and the phase-skipping or blocking pulses 78a if the values chosen by way of example should prove too large.

Thus, the stated times can be reduced by one half through inclusion of the divider stage 20g into the inputs of the AND circuits 22, 23 and 24.

For the performance of control operations depending upon an external parameter, e.g. temperature or liquid levels of a washing machine or a dishwasher, there are provided further AND gates 80–83 whose inputs are connected to the outputs 33e–33i of the storage matrix 33 and to whose outputs 80a to 83a are connected the sensors for temperature (T1, T2) and liquid level (N1, N2) as shown in FIG. 2a.

If a parameter-dependent control of temperature or liquid level is to be carried out during the evolution of the program, the corresponding pattern appears on outputs 33e–33i whereby one of the AND gates 80–83 has an output signal. At the same time the signal normally present on the line 33d is blocked so that pulse signals arriving from OR gate 25 are no longer transmitted through AND gate 26 and, thus, the time-controlled program evolution is interrupted. The pattern on leads 33e–33i simultaneously causes the program carrier 41 to establish the current parameter-dependent switching phase of the program, e.g. heating or water supply. When the corresponding parametric condition is satisfied, i.e. when the desired temperature or water level has been reached, the corresponding sensor selected by the AND gates 80–83 operates its contacts (T1, T2; N1, N2) and a signal is transmitted from one of the outputs 80a–83a to an OR stage 85 and from the output 85a thereof to the OR stage 27 whereby the electronic counter 30 is advanced by one step and, at the same time, the gate 26 passing the stepping pulses from logic circuit 22-24 is unblocked by re-energization of lead 33d. From this instant on the normally time-controlled program evolution continues.

This normal program evolution is brought about in that, depending upon the storage matrix 33 of the time-controlled read-only memory 35, i.e. in dependence upon the stored contents of this component, one of the AND gates 22, 23 or 24 is selected for pulse emission. The pulse train of the selected AND gate is transmitted via OR gate 25 to AND gate 26, which has been unblocked by a signal from the explicit output 33d of storage matrix 33, and thence to the OR gate 27 and from its output 27a to the electronic counter 30. The aforementioned switch 190 connected to the input 190a of AND gate 26 is a door-closure contact which is actuated, i.e. closed, only with the door of the controlled household appliance closed. As long as the door and with it the door contact is open, the AND gate 26 is not connected in circuit and the program counter 30 cannot be advanced by energization of its stepping input via OR gate 25.

During the program evolution, according to the program-dependent situation, the storage matrix 33 may effect a switchover of the pulse emission among the coincidence gates 22, 23 and 24 via its outputs 33a-33c. Depending on which of the AND circuits 22, 23 and 24 has been selected, a faster or slower transition of the several incremental program states and thus an acceleration or a retardation of the program evolution takes place.

To the inputs 33e-33 and 36a-36e of the electronic comparison circuit 36 there are connected respective AND circuits 86 and 87 with outputs 86a and 87a are extended to an AND circuit 88 whose output 83a is in turn connected to the resetting inputs of the frequency divider 20 and the electronic counter 30. If, at the end of the program, there appears at the outputs 33e-33 the code for a setting of the program carrier 41 to the 0 position and if the same has reached this 0 position, a signal is transmitted by way of the two AND gates 87 and 88 of the AND circuit 88 whereby, through the output 88a of this gate, the electronic frequency divider 20 and the electronic counter 30 are set to 0. In this 0 position, however, the pattern at the outputs 33e-33i and with it the AND condition for the gate 86 is terminated. This eliminates also the 0-setting criterion for the divider circuit 20 and the counting circuit 30 so that, upon a reactivation of the household appliance by the operation of switch 51, the dividing and counting process at the electronic components 20 and 30 can be restarted.

At the AND gates 70-75, 80-83, 86 and 87 of the decoder illustrated in FIG. 2, certain inputs are inverting, as indicated, in conformity with the pattern signal of leads 33e to 33i or 36a to 36e, respectively, which they are designed to detect.

Figure 3:
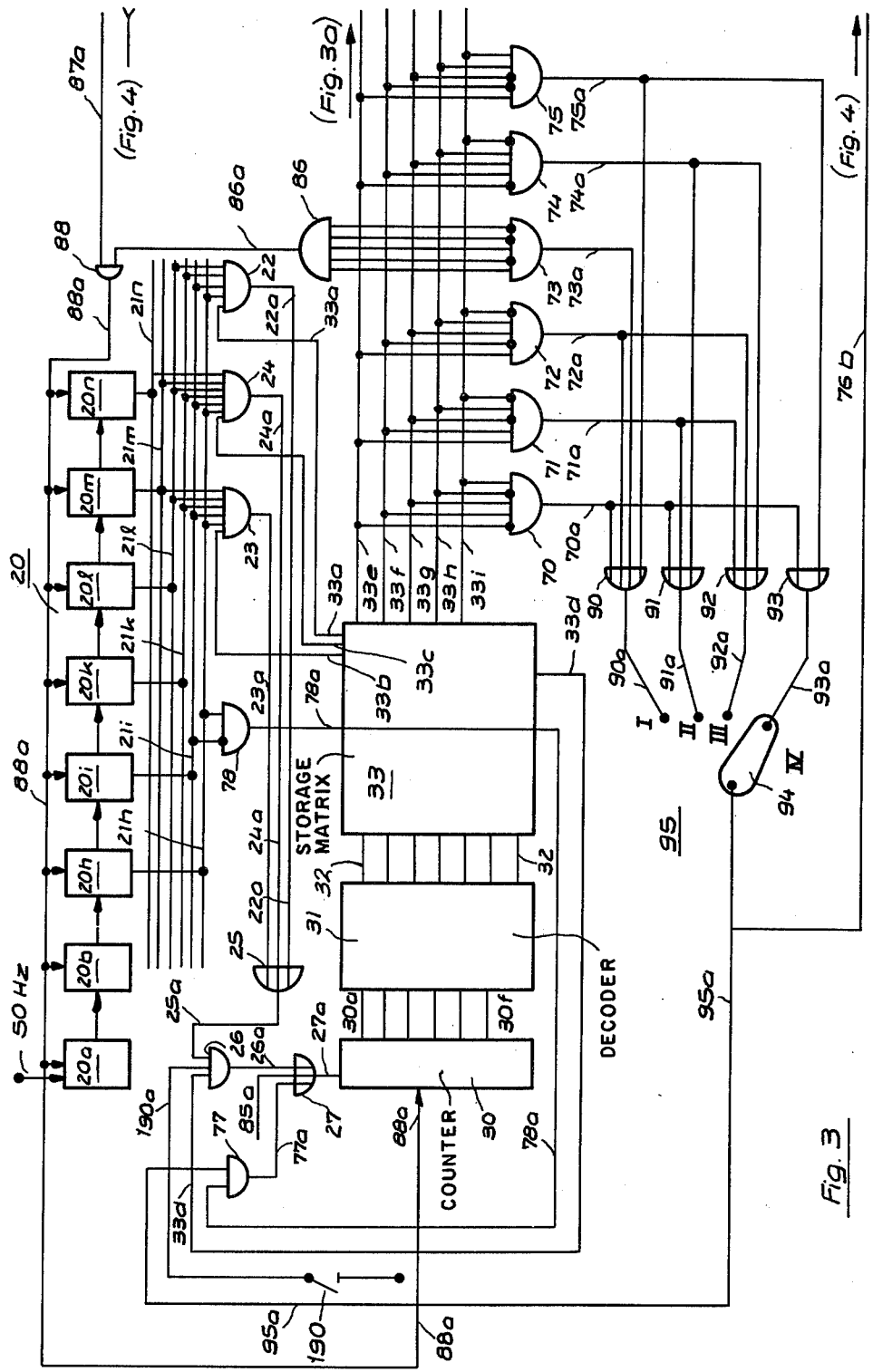

FIG. 3 represents a modified embodiment of the invention. The electrical programmer according to FIG. 3 is preferably designed to control such automatic household appliances in which only a few permanent programs are to be executed and an adaptation of the household appliance to new working programs corresponding to the advancing technology is not required. For this purpose there is provided a program selector 95 whose possible program-selection positions I-IV, four by way of example, are selectable by a manually displaceable switch arm 94.

In conformity with the arrangement according to FIG. 2, the outputs 33e-33i of the storage matrix 33 of the time-controlled read-only memory 35 are tested by a decoder again consisting of several AND circuits 70-75 whose outputs 70a-75a are grouped together in OR gates 90-93. Each group of AND gates 70-75, connected to one of the OR stages, represents the totality of the individual operating phase or incremental program states which during the selected program evolution are to be eliminated from or skipped in the maximum program recorded in the storage matrix 30 and designed to be read out therefrom. The outputs 90a-93a of OR stages 90-93 are respectively connected to contacts I-IV of the selector switch 95. The signal passing over the selected contact I-IV and the switch arm 94 is fed by way of a connecting line 95a (replacing line 76a) to the AND gate 77. Thereby, as described with reference to FIG. 2, the advance of the electronic counter 30 is effected which results in the readout of a new program state by the storage matrix 33.

The function of the other electronic components constituting the circuit arrangement according to FIG. 3 is the same as that already described for the circuit arrangement of FIG. 2. The same goes, moreover, also for the circuit arrangement of FIG. 4 which evidently complements the circuit arrangement of FIG. 3.

The embodiment of FIGS. 3 and 3a permits a simple, economical construction of the electric programmer pursuant to the invention will renunciation of an optional expansion of the control possibilities of the programmer in the manner available with the arrangement of FIG. 2.

To insure a permanent storage capability, i.e. a readability of the electronic counter 30 independent of an external current supply, I prefer to provide that counter with a small secondary battery as a current supply which can be replenished from the network. Such a secondary battery, e.g. a nickel-cadmium accumulator consisting of 3-4 button cells, is capable of bridging power failures of the network over many hours without detrimentally affecting the stored count of the electronic counter 30 and changing its reading.

Counters may also be used for this purpose whose semiconductive components embody the so-called MNOS technology inasmuch as such components are able to preserve an applied charge for a very long time and thus can bridge network outages for a sufficient period without a special power supply. These details have not been illustrated in the representation of the drawing since they are known per se and are understandable also without such representation.

Automatically controlled household appliances are known wherein, besides a so-called principal program which generally is run through only once upon an activation of the appliance, there is also established a so-called ancillary program which can be continuously repeated. Thus, for example, in the case of an automatically controlled washing machine there is read out by the controller, besides the washing program proper, also an ancillary control program for the reversal of the washing drum which is continuously repeated and is halted only in a few phases of the program evolution. It is known to use for this purpose two separate programmers with respective individual drive motors. I prefer to design the driving device of the electric programmer for this purpose in such a way that the ancillary program is read out via the continuously operating drive motor through an ancillary shaft and that the program carrier 41 is advanced through its successive working positions via an electromagnetic coupling device controllable by the comparison circuit 36.

Such a design of the driving device of the program carrier 41, known per se, is economical and compact since the electromagnetic coupling device can be made small and manufactured inexpensively. Moreover, the proposed construction enables a positive connection between the principal and ancillary programs. This is important e.g. for the start of the centrifuging stage of an automatically controlled household appliance where, at the beginning of the centrifuging drive, a certain direction of rotation of the washing machine must be inevitably maintained in the ancillary program.

Another advantageous feature of the present system resides in the fact that, if despite nonfulfillment of the liquid-level condition in an automatically controlled washing machine or dishwasher—caused for example by a malfunction of the control or the household appliance—the programmer should inadmissibly switch to "heating", this pattern read out by the storage matrix is converted into the pattern "rest position". The program carrier 41 is thereby moved out of the position "heating" and into the position "rest" in which then, as an additional safety measure, the automatic and permanent deactivation of the washing machine takes place.

Another modification of the arrangement according to FIGS. 2 and 3 within the scope of the invention resides in additionally varying, with the aid of the selector switch 16 (FIG. 1) representative of the programmable memory 60 (FIG. 2) or the switch 95 (FIG. 2), the correlation of the several pulse trains emitted by the AND gates 22, 23 and 24 with the respective incremental program states. This is done by assigning to the time-controlled storage matrix 33 on the word lines several successive, identical patterns of outputs 33e–33i which, however, are tied via different outputs 33a–33c to different AND gates 22, 23 24 and, therefore, pulse trains. With the aid of the selector switch it is then possible to choose those AND gates 70–75 which correspond to patterns whose assigned pulse trains are unwanted and which therefore are to be skipped or eliminated. Thus, for example, in the case of a household washing machine the incremental program state "centrifugation" may appear several times in succession in the pattern of the storage matrix 33, once with a duration of, say, 0.7 min, the other time with 1.4 min. and finally with 2.8 min. The selection of the desired interval during which always the same program state has to be maintained, i.e. "centrifugation", is made by skipping or eliminating the same incremental program states having, however, the unwanted pulse trains assigned thereto. Such an arrangement facilitates with simple means, by way of the selector switch, a correction of the duration of one and the same program state for different program evolutions.

In similar manner it is possible, with the aid of the selector switch, to influence also the control of the parametric conditions associated with the incremental program states. Thus, one can envisage an extension of the circuit arrangement of FIGS. 2 and 3 in this sense wherein, as shown in FIG. 2a, the AND stages 80–83 each have a further input connected to respective outputs 63g to 63k of the storage matrix 63 of the card-controlled read-only memory 60 enabling, in dependence upon the circuit connection thereof, an additional modification dependent on the selected program, also during evolution of the program, of the parametric conditions to be fulfilled.

I claim:

1. A system for the automatic control of an electrical appliance to be sequentially stepped through a predetermined number of operating phases, comprising:
    a read-only memory for storing a multiplicity of instruction codes defining consecutive phases of a maximum operating program;
    electronic counting means connected to said read-only memory for sequentially addressing same to read out said instruction codes in a predetermined order of succession;
    a rotatable control unit including a program carrier generating, in successive working positions, a multiplicity of signal patterns respectively corresponding to said instruction codes, said control unit further having output means for the selective activation and deactivation of components of a controlled appliance in any of said working positions;
    drive means for rotating said control unit;
    electronic comparison means, with input connections to said memory means and to said program carrier, connected to said drive means for arresting said control unit upon detecting a match between an instruction code emitted by said memory means and a signal pattern generated by said program carrier;
    a source of stepping pulses connected to said counting means for progressively advancing same to command the sequential readout of successive instruction codes of said maximum operating program;
    presettable decoding means connected to said read-only memory in parallel with said comparison means for detecting certain instruction codes pertaining to unwanted phases of said maximum operating program and, in response to such detection, inhibiting the arresting of said drive means by said comparison means with simultaneous emission of a phase-skipping pulse fed to said counting means for advancing same out of turn; and
    selector means connected to said decoding means for varying the setting thereof.

2. A system as defined in claim 1 wherein said instruction codes are combinations of binary signals appearing on a plurality of output leads of said read-only memory, said decoding means comprising a plurality of coincidence gates with inverting and noninverting inputs connected to said output leads.

3. A system as defined in claim 2 wherein said selector means comprises a programmable ancillary memory.

4. A system as defined in claim 3 wherein said coincidence gates have blocking inputs energizable by said ancillary memory.

5. A system as defined in claim 2 wherein said selector means comprises a manual switch operable to connect any of said coincidence gates to a stepping input of said counting means.

6. A system as defined in claim 1 wherein said source has first output means carrying said stepping pulses and second output means carrying additional pulses offset from said stepping pulses, further comprising gating means connected to said second output means and controlled by said decoding means for selectively passing any of said additional pulses as a phase-skipping pulse to said counting means.

7. A system as defined in claim 6 wherein said source comprises a frequency divider with a multiplicity of cascaded stages, said first and second output means receiving different combinations of output signals from certain of said stages.

8. A system as defined in claim 7 wherein said first and second output means include two AND gates with respective inputs invertingly and noninvertingly connected to the same stage of said frequency divider.

9. A system as defined in claim 7 wherein said first output means comprises a plurality of logic gates with inputs connected to different combinations of said stages, said logic gates being selectively blockable and unblockable by said read-only memory for varying the cadence of said stepping pulses.

10. A system as defined in claim 6 wherein said first output means is responsive to a blocking signal from said read-only memory for temporarily preventing the advance of said counting means by said stepping pulses, further comprising sensing means actuatable by said read-only memory in the presence of said blocking signal for restarting the advance of said counting means upon detecting a predetermined external parameter associated with the controlled appliance.

11. A system as defined in claim 10 wherein said sensing means comprises a plurality of parameter sensors actuatable via respective logic circuits connected to output leads of said read-only memory carrying said instruction codes in the form of combinations of binary signals.

12. A system as defined in claim 11 wherein said selector means has output connections to said logic circuits for selectively blocking and unblocking same.

13. A system as defined in claim 11 wherein said counting means is provided with a stepping input connected through an OR gate to said first output means, said gating means and said sensing means.

* * * * *